June 14, 1960   R. E. S. THOMPSON ET AL   2,940,768
ROAD VEHICLES HAVING VERTICALLY ADJUSTABLE FRAMES
Filed Aug. 19, 1958   6 Sheets-Sheet 1

INVENTORS
ROBERT E.S. THOMPSON
KIRWAN Y. MESSICK
BY Prangley, Baird, Clayton,
Miller & Vogel   ATTORNEYS June 14, 1960 R. E. S. THOMPSON ET AL 2,940,768
ROAD VEHICLES HAVING VERTICALLY ADJUSTABLE FRAMES
Filed Aug. 19, 1958 6 Sheets-Sheet 2
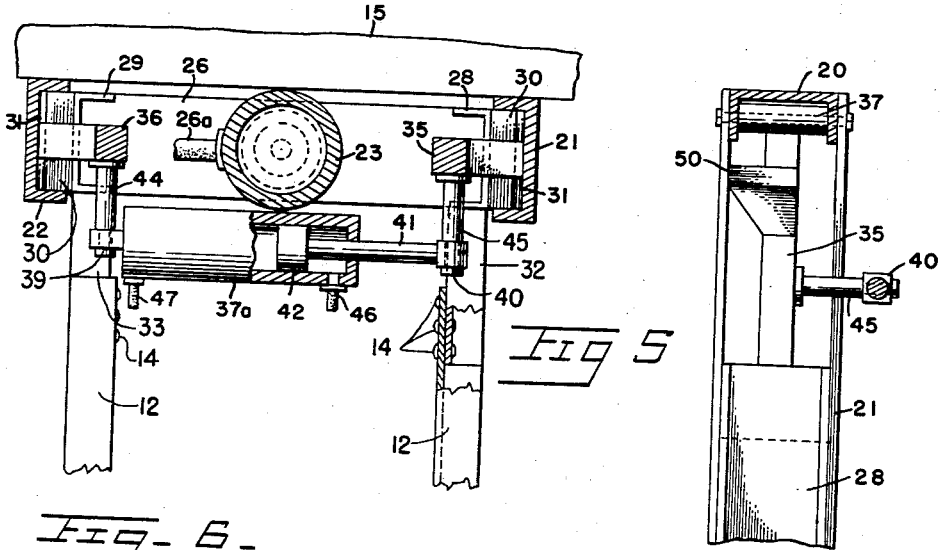
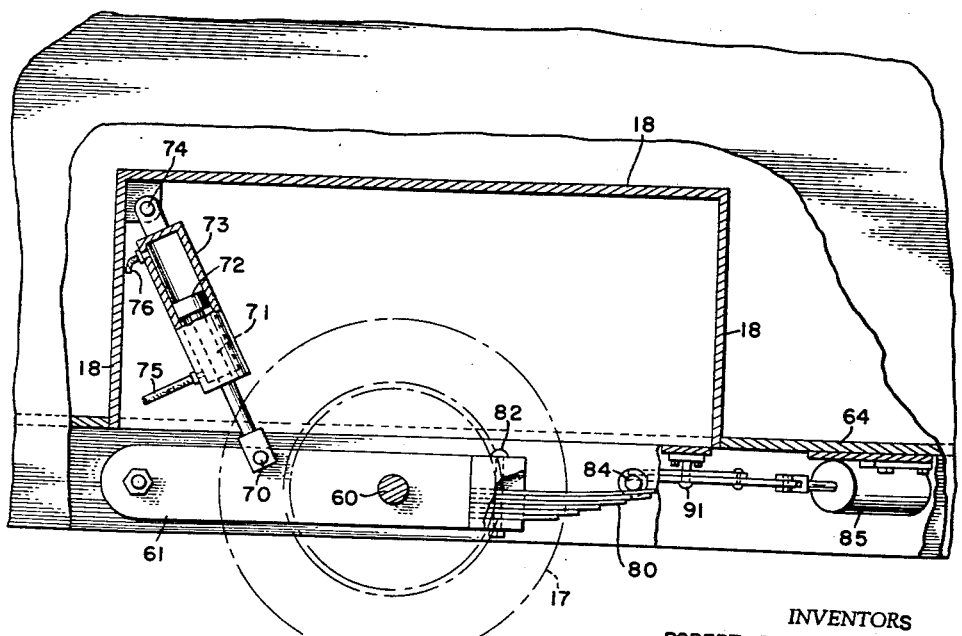
INVENTORS
ROBERT E.S. THOMPSON
KIRWAN Y. MESSICK
BY
Prangley, Baird, Clayton,
Miller & Vogel, ATTORNEYS June 14, 1960

R. E. S. THOMPSON ET AL 2,940,768

ROAD VEHICLES HAVING VERTICALLY ADJUSTABLE FRAMES

Filed Aug. 19, 1958

INVENTORS
ROBERT E.S. THOMPSON
KIRWAN Y. MESSICK
BY
ATTORNEYS

June 14, 1960  R. E. S. THOMPSON ET AL  2,940,768
ROAD VEHICLES HAVING VERTICALLY ADJUSTABLE FRAMES
Filed Aug. 19, 1958  6 Sheets-Sheet 4

INVENTORS
ROBERT E. S. THOMPSON
BY KIRWAN Y. MESSICK

ATTORNEYS

June 14, 1960 R. E. S. THOMPSON ET AL 2,940,768
ROAD VEHICLES HAVING VERTICALLY ADJUSTABLE FRAMES
Filed Aug. 19, 1958 6 Sheets-Sheet 5

INVENTORS
ROBERT E. S. THOMPSON
KIRWAN Y. MESSICK
BY *Prangley, Baird, Clayton, Miller & Vogel*
ATTORNEYS

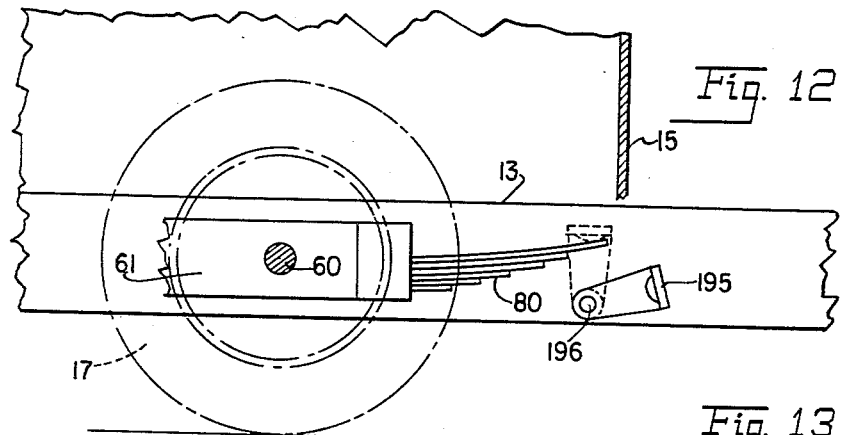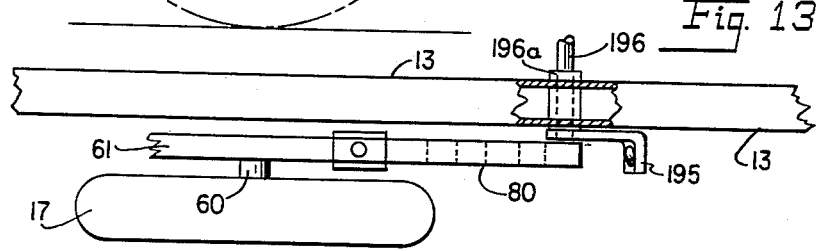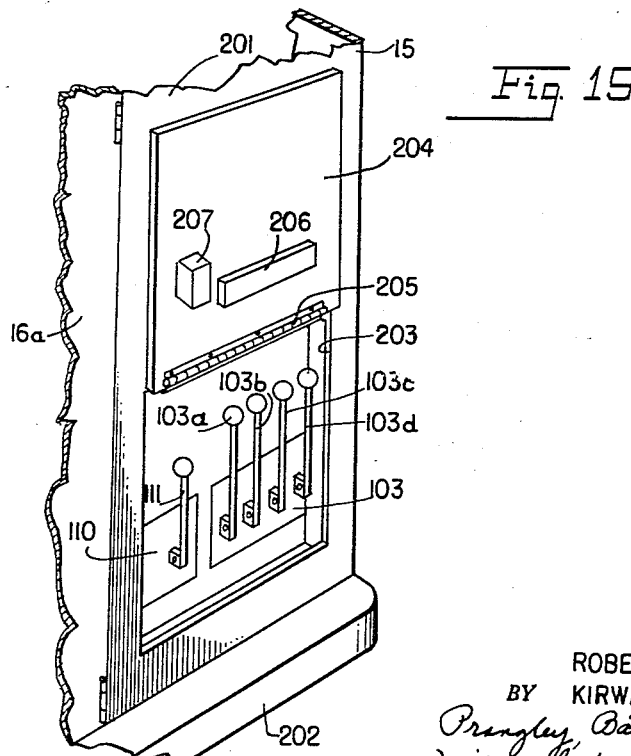

United States Patent Office 2,940,768
Patented June 14, 1960

2,940,768

ROAD VEHICLES HAVING VERTICALLY ADJUSTABLE FRAMES

Robert E. S. Thompson, Owings Mills, Md., and Kirwan Y. Messick, Arlington, Va., assignors to Thompson Trailer Corporation, Baltimore, Md., a corporation of Virginia Filed Aug. 19, 1958, Ser. No. 755,970

10 Claims. (Cl. 280—43.18)

The present invention relates to road vehicles having vertically adjustable frames and arranged to support and to carry freight or other ladings. More particularly, the vehicle comprises a load-carrying body that is adapted to be selectively elevated and lowered with respect to a road-traveling position by a mechanical arrangement in order that the body may be selectively moved from the road-traveling position to a lower position near the ground or from the road-traveling position to an upper position disposed well above the road-traveling position and corresponding, for instance, to the elevation of a loading dock. Of course, the body of the vehicle can also be adjusted into any desired vertical position disposed intermediate the extreme lower and upper positions mentioned. This application is a continuation-in-part of the application of Robert E. S. Thompson and Kirwan Y. Messick, Serial No. 671,606, filed July 12, 1957, now abandoned.

While there have been a number of proposals in the patent art relating to highway or street trucks and trailers having load-carrying bodies capable of being elevated and lowered, as yet such vehicles have not met with any significant commercial success, as evidenced by the relatively few that are in service. From inspection of a number of patent disclosures and examination of a commercial size trailer exemplary of a patented structure, it is apparent that the minor commercial acceptance of these vehicles is due primarily to disadvantages therein, such as the bulkiness of the elevating and lowering equipment which is unsightly and causes a loss of freight space, and to the use of mechanical arrangements which lead to breakdowns and excessive costs, as well as difficulties in operation.

In accordance with the present invention there has been devised a freight-carrying vehicle of highway or street size, preferably capable of carrying at least about a two-ton load, having a body that can be elevated and lowered between a position on or near the ground to a height substantially above the rear axle level; which vehicle is compact, of simple mechanical construction and easy to operate. The invention is particularly useful in providing a unitary truck, as distinguished from a trailer; and a commercial prototype of such a truck has proven that the structure affords the various features desired in an acceptable road vehicle useful for carrying freight.

Accordingly, it is a general object of the present invention to provide a unitary road vehicle including a front cab provided with front road wheels, a rear bed provided with rear road wheels, a connection between the rear of the front cab and the front of the rear bed and accommodating relative vertical sliding movements therebetween, and an improved arrangement for selectively adjusting the position of the connection mentioned and for selectively locking the connection in a road-traveling position.

Another object of the invention is to provide in a unitary road vehicle of the character described, an improved structure between the extreme rear end of the front cab and the sliding connection mentioned that involves a pair of laterally spaced-apart and longitudinally extending hollow supporting beams rigidly secured to the front cab and terminating adjacent to the rear portion thereof, and a laterally extending cross member provided at the opposite ends thereof with a pair of rigid and forwardly directed projections respectively extending into the rear ends of the hollow supporting beam and respectively rigidly secured thereto.

Another object of the invention is to provide a road vehicle including a longitudinally extending frame, a pair of front road wheels carried by the front of the frame, a pair of laterally spaced-apart and longitudinally extending arms respectively disposed on opposite sides of the rear of the frame and pivotally mounted at the front ends thereof upon the frame for vertical movements with respect thereto, a pair of stub shafts respectively carried by the rear ends of the arms and respectively extending laterally outwardly in opposite directions therefrom, a pair of rear road wheels respectively carried by the stub shafts, and an improved arrangement for selectively adjusting the positions of the arms and for selectively locking the arms in road-traveling positions.

A further object of the invention is to provide a road vehicle of the character described, and further including a pair of resilient cushioning mechanisms that are selectively connectible and disconnectible between the rear of the frame and the rear ends of the arms when the arms occupy their road-traveling positions, so that the arms, and consequently the rear wheels, may be resiliently supported in their road-traveling positions.

A still further object of the invention is to provide in a road vehicle of the character described, an improved hydraulic control system for selectively adjusting the connection between the rear of the cab and the front of the bed and for selectively adjusting independently of each other, each arm of the pair, and consequently each of the rear road wheels, and also for selectively locking the arms, and consequently the rear road wheels, in their road-traveling position.

Further features of the invention pertain to the particular arrangement of the elements of the road vehicle, whereby the above-outlined and additional operating features thereof are attained.

The invention, both as to its organization and method of operation, together with further objects and advantages thereof, will best be understood by reference to the following specification taken in connection with the accompanying drawings, in which:

Figure 4 is essentially a transverse sectional view taken along line 4—4 of Figure 3;

Figure 5 is a vertical sectional view taken along line 5—5 of Figure 3;

Figure 6 is an enlarged, fragmentary side view of the truck illustrated in Figure 1 with a panel thereof broken away to show in section one embodiment of the elevating and lowering mechanism located at each of the rear wheels;

Figure 12 is a fragmentary side elevational view, similar to Figure 6, of a modified form of the mechanism;

Figure 13 is a fragmentary plan view, similar to Figure 7, of the mechanism;

Figure 14:
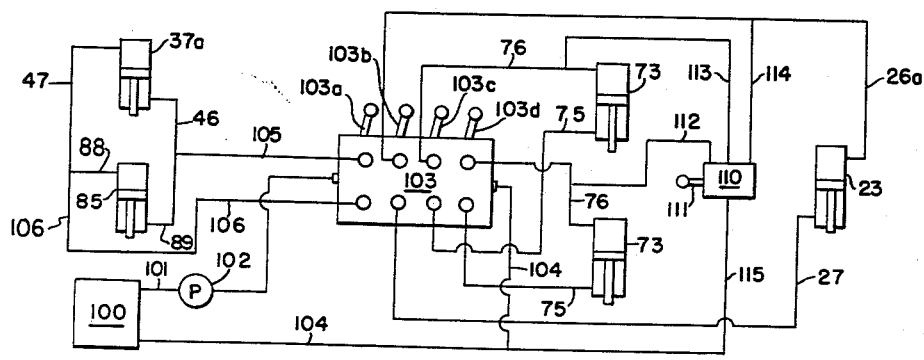

Figure 14 is a schematic diagram of a fluid circuit system that is employed to control elevating and lowering of the truck body, and also to control locking and unlocking of the truck body in its road-traveling position; and Figure 15 is an enlarged fragmentary perspective view of the right rear corner of the truck body, illustrating the housing in which there are arranged the manually operable control levers of the valve mechanism incorporated in the fluid circuit system of Figure 14.

Figure 1:
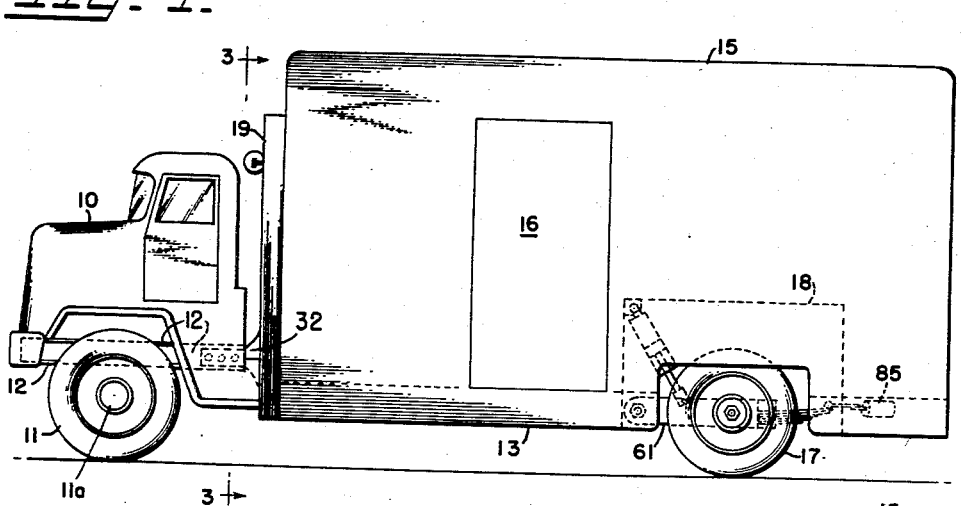
Figure 1 is a side view in elevation of a unitary truck in road-traveling position and constructed in accordance with one embodiment of our invention.
Figures 2, 3:
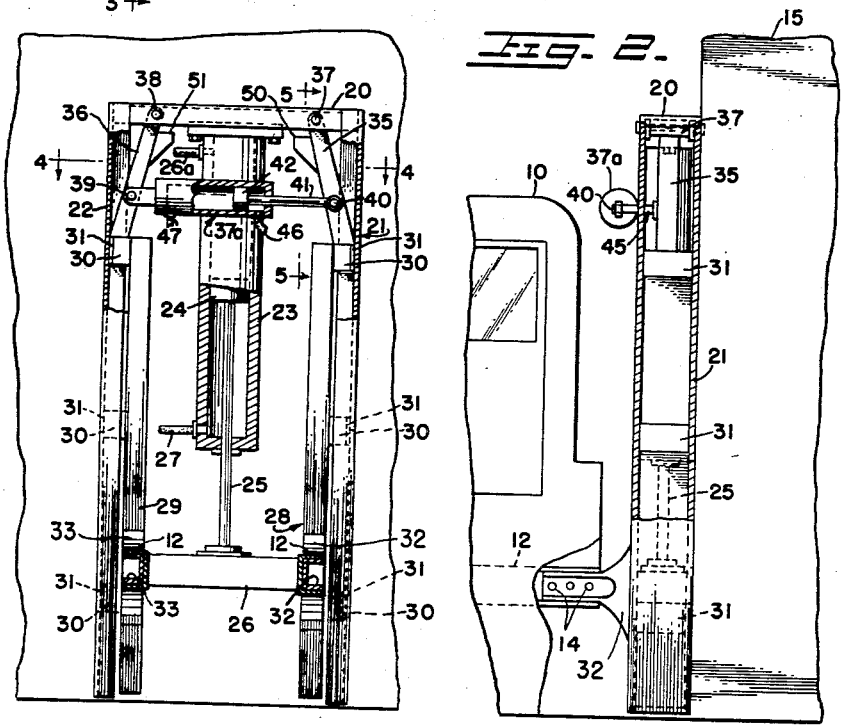
Figure 2 is an enlarged, broken side view partly in elevation and partly in section of the elevating and lowering mechanism located at the forward end of the truck body of Figure 1.
Figure 3 is an enlarged, vertical sectional view, taken along line 3—3 of Figure 1, of the forward elevating and lowering means with portions thereof broken away and shown in section.

Referring now to Figure 1 of the drawings, there is illustrated a truck embodying the features of the present invention and essentially comprising a front cab 10 and a rear freight-carrying body or bed 13. The truck is of a conventional front wheel driven type and includes an engine, not shown, arranged under the forward hood of the cab 10, as well as a driver's seat and steering mechanism arranged within the cab 10, the steering mechanism being arranged to manipulate front road wheels 11 mounted at each end of a front axle 11a supporting the front of the cab 10. A pair of laterally spaced-apart and longitudinally extending main channel beams 12 are provided in supporting relation beneath the opposite sides of the cab 10; which beams 12 are connected to the bed 13 by a pair of fixtures 32 and 33. More particularly, the beams 12 are hollow and are carried by the front axle 11a through conventional spring sets, not shown; and the fixtures 32 and 33 are provided at the opposite ends of a laterally extending cross-member 26, as best shown in Figure 3. Specifically, the pair of fixtures 32 and 33 are rigid and project forwardly into the adjacent rear open ends of the beams 12 and are rigidly secured in place by any suitable arrangement, rivets 14 being illustrated for the purpose. The truck body 13 is equipped with a housing or van 15 having access doors 16 in the side walls thereof, and an access door 16a in the rear wall thereof, accommodating the introduction and removal of lading with respect to the lading compartment defined therein.

The rear portion of the body 13 is supported by road wheels 17 located at the opposite sides thereof and adjacent to the rear end thereof. Each rear wheel 17 is illustrated as being a single wheel, but could, of course, be a dual or other type wheel, and is equipped with elevating and lowering mechanism therefor, that is located within an individually associated housing 18 disposed at the adjacent side of the van 15. Thus the pair of housings 18 are disposed at the opposite sides of the van 15 and adjacent to the rear end thereof and constitute rear fenders. Moreover, the rear fenders 18 project well above the truck bed 13.

The truck also comprises mechanism for elevating and for lowering the front end of the bed 13 with respect to the rear end of the cab 10; which mechanism is indicated generally at 19 in Figure 1. As illustrated in Figures 2 to 5, inclusive, the details of the mechanism for elevating and for lowering the forward end of the truck body are shown in road-traveling position. Rigidly attached to the front side of van 15 near its top is an upper cross-channel member 20 extending transversely thereof. At each extremity of this upper cross-member, there is located a generally U-shaped vertical channel denoted respectively with the numerals 21 and 22, and each such vertical channel is also rigidly secured to the forward wall of van 15. Depending from the center of cross-member 20 is a fluid-pressure cylinder 23 housing a piston 24 therein which is connected to a piston rod 25. This piston-cylinder combination is preferably of the double-acting type in order to facilitate the raising and lowering of the front end of the truck body. Fluid can be supplied and withdrawn from the cylinder above and below the piston 24 through conduits 26a and 27, respectively.

The lower end of piston rod 25 is secured to the lower cross-member 26 which is not attached to the van. At each extremity of the lower cross-member 26 and spaced inwardly of channels 21 and 22 are vertical beams 28 and 29 which are rigidly secured to the lower cross-member, but are not secured to the truck van. Located along the length of beams 28 and 29 are vertically spaced riding blocks 30 which guide U-shaped channel members 21 and 22 in engagement with the inner surfaces of the back and side walls thereof as is seen most clearly in Figure 4. Preferably, the faces of blocks 30 are defined by removable bronze plates 31 to facilitate the sliding movement between blocks 30 and channel members 21 and 22 during the elevating or the lowering of the forward end of the truck body.

Projecting forwardly from the lower cross-member 26, and located at its lateral extremities, are the horizontally disposed rigid fixtures 32 and 33, previously mentioned; which fixtures 32 and 33 are channel-shaped at the forward ends thereof and fit in back-to-back relation respectively within cooperating ones of the channel beams 12 disposed at the rear of the forward cab 10, as previously explained. The fixtures 32 and 33 are thus secured in telescopic relation within the beams 12 by the rivets 14 illustrated; however, welding may be employed, if desired. By providing this telescopic or overlapping engagement, the overall rigid, sliding connection between cab 10 and the body of the truck 13 through the front end elevating mechanism is sufficiently strong to support and maneuver the desired loads. It is apparent that beams 12 could extend directly to cross-member 26; however, if beams 12 be so made and of sufficient strength to carry and maneuver the desired load in a conventionally proportioned truck, they then may be oversized for the cab. This, of course, can give rise to undue cost and accordingly, it has been found that the overlapping structure at the rivets 14 is quite advantageous in providing adequate support for the truck body from beams 12 which would otherwise be undersized for maneuvering and carrying a loaded truck body, and in adapting stock vehicles of the fixed bed type to the unitary truck shown in the drawings.

Although hydraulic cylinder 23 might be of the single-acting type, it is, as stated previously, preferred that it be double-acting. If it were single-acting, when elevating the truck body fluid would be pumped into conduit 26a and theoretically, the forward end of the body would descend merely by releasing pressure in conduit 26a. However, the use of a single-acting cylinder in this manner is disadvantageous since the mechanism tends to bind and free descent of the forward end of the truck body is thereby prevented. To overcome this difficulty, a double-acting hydraulic cylinder 23 is provided and thus when the forward end of the truck body is lowered, not only is fluid withdrawn through conduit 26a but in addition the hydraulic liquid is pressured into the lower part of the cylinder below piston 24 through line 27. Accordingly, any binding of the front end elevating mechanism is overcome by the force of the pressured liquid entering line 27.

At the forward elevating and lowering mechanism of the truck, illustrated in the drawings, it is preferred to provide means for locking the body in road-traveling position in order to avoid its descent upon inadvertent loss of fluid from above piston 24 in cylinder 23. To accomplish this end, there are provided separate locking arms 35 and 36 pivotally mounted respectively within upper cross-member 20 on pins 37 and 38 which rigidly relate the arms and cross-member with respect to vertical movement. In Figure 3, these arms are shown in locking position, that is, their lower extremities are forced outwardly against the back and within the sides of channel members 21 and 22. In this position, the arms abut the upper blocks 30 mounted on each of the beams 28 and 29; thus preventing lowering of the truck van from the road-travel position shown even through the hydraulic pressure on the upper side of the piston 24 be lost.

Arms 35 and 36 are actuated by a double-acting hydraulic piston-cylinder combination freely suspended between these arms forwardly of the cylinder 23; thus, the cylinder 37a is pivotally attached at 39 to rod 44 which extends forwardly beyond piston 23 from arm 36 while piston rod 41 which is secured to the piston 42 is pivotally mounted at 40 on rod 45 which extends forwardly past piston 23 from arm 35. The cylinder 37a is of the double-acting type and liquid is supplied and withdrawn to and from the opposite sides of piston 42 through lines 46 and 47

To unlock the forward elevating means so that the front end of the body can be lowered, arms 35 and 36 are swung inwardly towards cylinder 23 until their lower ends are clear of beams 28 and 29. This is accomplished by pumping fluid through line 46 to the piston rod side of piston 42. However, since cylinder 37a is attached only to arm 36 and piston rod 41 is attached only to arm 35, we have provided separate stops 50 and 51 mounted near the upper ends of arms 35 and 36, respectively, which serve as a centering means during retraction of the arms. These stops project inwardly towards cylinder 23 and when arms 35 and 36 are drawn towards one another, the stops 50 and 51 contact the upper plate of cross-member 20, thus preventing either arm 35 or arm 36 from being drawn too far in the direction towards piston 23 so that the remaining movement between piston 42 and cylinder 37a will not clear the opposite arm from its respective beam 28 or 29. Thus, by pumping fluid into line 46, both arms 35 and 36 are drawn inwardly a distance sufficient to clear their respective beams 28 and 29 which permits the unlocking of the truck body as beams 28 and 29 with their respective blocks 30 can then move upwardly within channel members 21 and 22.

It is also to be noted that the upper pivot points of locking arms 35 and 36 are located sufficiently towards cylinder 23 so that when the arms are extended to locking position within channel members 21 and 22, the arms have gone past the vertical center line of their respective pivots. Thus when there is a tendency for the forward end of the truck body to descend, arms 35 and 36 become more securely locked. In such a case, however, it may be necessary before arms 35 and 36 can be retracted to elevate the forward end of the truck slightly by pressuring hydraulic fluid against the top of piston 24.

Figure 7:
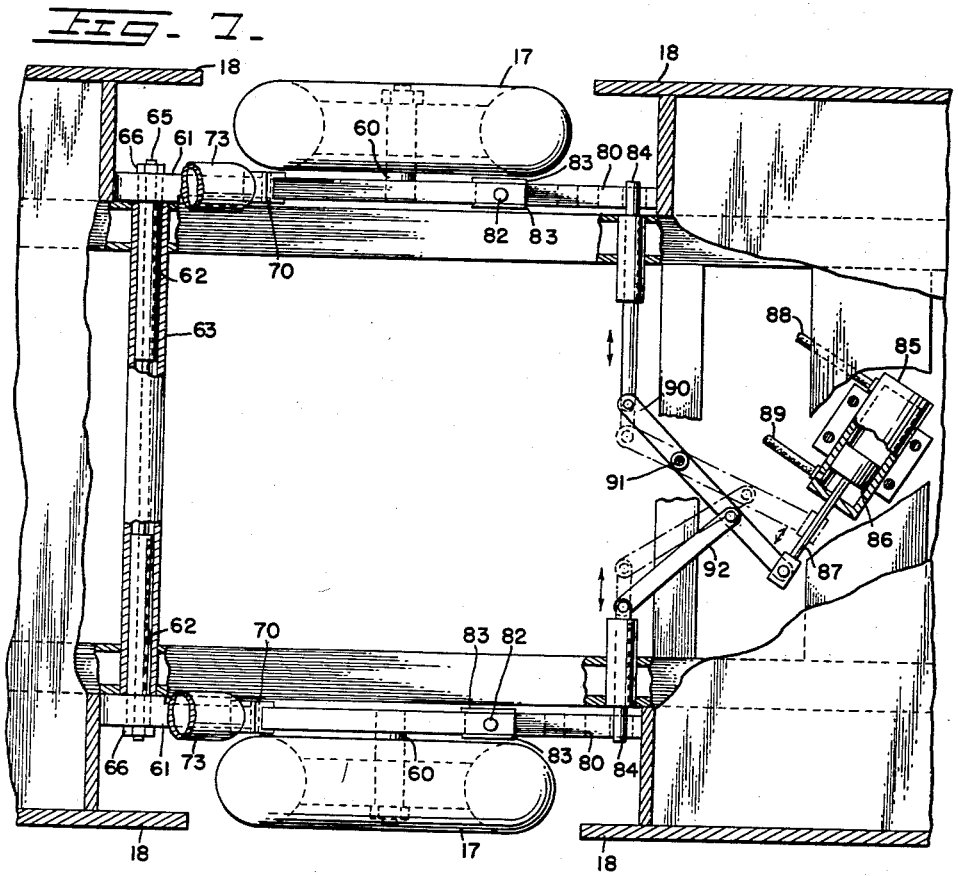
Figure 7 is an enlarged, broken longitudinal sectional view of the truck illustrated in Figure 1 showing essentially in top plan the overall rear elevating and lowering mechanism which includes a first embodiment of an arrangement for locking the rear of the truck body in road-traveling position.

Referring now to the embodiment shown in Figures 1, 6 and 7, for elevating and for lowering the rear portion of the truck body, the rear road wheels 17 are rotatably mounted on stub axles 60 whose inner ends are secured in arms 61 positioned inwardly of wheels 17. The stub axles might be replaced by a single through axle but this would disturb the freight area of the truck when the bed is lowered as such axle would pass through the wheel housings 18. This disturbance would be lessened somewhat by having the center of any such through axle, for a distance corresponding to the width of the truck bed, depressed towards the ground, but in any event, the stub axle arrangement shown in the drawings is preferred.

At their forward portions, arms 61 are attached to tubes 62 perpendicular therewith which engage interfittingly and rotate within the tubular receiver 63 extending transversely beneath the truck floor 64 and abutting at each end against the respective arms 61. The rod 65 passes from the outside of one arm 61 coaxially through tube 63 and tubes 62 to the outside of the other arm 61 and is threaded at each end to receive locking nuts 66. By tightening nuts 66, arms 61 and tubular members 62 are secured against lateral movement in and out of member 63, and thus the rear wheels are held in trucking alignment. However, this connection does not prevent the pivoting of arms 61 and tubular members 62 within tubular member 63 when the rear end of the truck body is elevated or lowered. The particular arrangement shown for pivotally mounting arms 61 to the truck body should facilitate assembly and proper alignment of the rear wheels.

In order to raise and to lower the respective sides of the rear end of the truck body a hydraulic piston cylinder structure is provided at each rear wheel. Thus, piston rod 71 is pivotally mounted at 70 intermediate the forward pivot point of arm 61 and stub axle 60. Piston rod 71 extends to piston 72 within cylinder 73. The upper end of cylinder 73 is pivotally mounted on cross-bar 74 which extends horizontally across housing 18 at a point above the road wheels 17 near the forward upper corner of housing 18. In the drawing, the hydraulic cylinder 73 is shown as the double-acting type and fluid is supplied and withdrawn from the opposite sides of piston 72 by way of lines 75 and 76. Thus, when it is desired to raise a given side of the bed from the position shown in Figure 6, fluid can be pumped through line 76 to the upper side of piston 72 while taking fluid from beneath the piston by way of line 75. When lowering the bed, the hydraulic fluid is passed into the cylinder through line 75 to the underside of piston 72 and the fluid on top of the cylinder exits through line 76. Although it is preferred to have a double-acting cylinder of this type, this is not absolutely necessary since when lowering a rear portion of the bed, if the pressure on line 76 is released, the force of gravity will provide this action without undue binding. The double-acting cylinder, however, is preferred as this affords for smoother operation of the elevating and lowering mechanism.

It is highly desirable that the rear portion of the bed be securable when in road-traveling position to avoid its descent should the fluid pressure be lost or released on top of pistons 72. In fact, it is preferred that the rear wheels be locked in road-traveling position so that the fluid pressure on pistons 73 can be released. In this way, road wheels 17 can be equipped with springs which provide for easier riding. Figures 6 and 7 illustrate one type of rear wheel locking device which also provides for spring mounting of the rear of the truck body. Thus, at the rear ends of arms 61 leaf springs 80 are held by the nut and bolt arrangements 82 within a receiving slot in arms 61 whose sides are formed by plates 83. The leaf springs 80 extend rearwardly of arms 61 for a distance such that the ends thereof are disposed beneath pins 84 which are carried by the body 13. Since pins 84 extend across vertical planes defined through the longitudinal axes of the springs, the springs are held against vertical movement by the truck body, and the body is then secured or locked against descent when the wheels 17 are in traveling position.

To permit the lowering of the truck body, pins 84 are retracted inwardly and thus laterally of the bed so that leaf springs 80 are free to swing upwardly in a vertical path. Of course, when raising the bed the springs can move downwardly in this path even when the pins are extended. The retraction of pins 84 is effected through the actuation of double-acting hydraulic cylinder 85 and should it be desired to release a binding force upon pins 84 before they are retracted, the truck body can be slightly elevated through operation of hydraulic cylinder 73.

Cylinder 85 is equipped with piston 86 which is attached to piston rod 87. Fluid can be supplied to the opposite sides of piston 86 through lines 88 and 89. The piston rod 87 extending from cylinder 85 is pivotally mounted on arm 90 which is in turn pivoted to the truck body at 91. One pin 84 shown in Figure 7 on the right side of the truck body is pivotally attached to the forwardly extending end of arm 90 while the other pin 84 is pivotally attached to arm 92 which in turn is pivotally secured to arm 90 between point 91 and the connection of piston rod 87. Thus, by pumping fluid into cylinder 85 through line 88, pins 84 are extended as shown in Figure 7 and can be retracted by passing fluid to cylinder 85 through line 89. Cylinder 85 is securely mounted on the truck body beneath floor 64 thereof.

Figure 9:
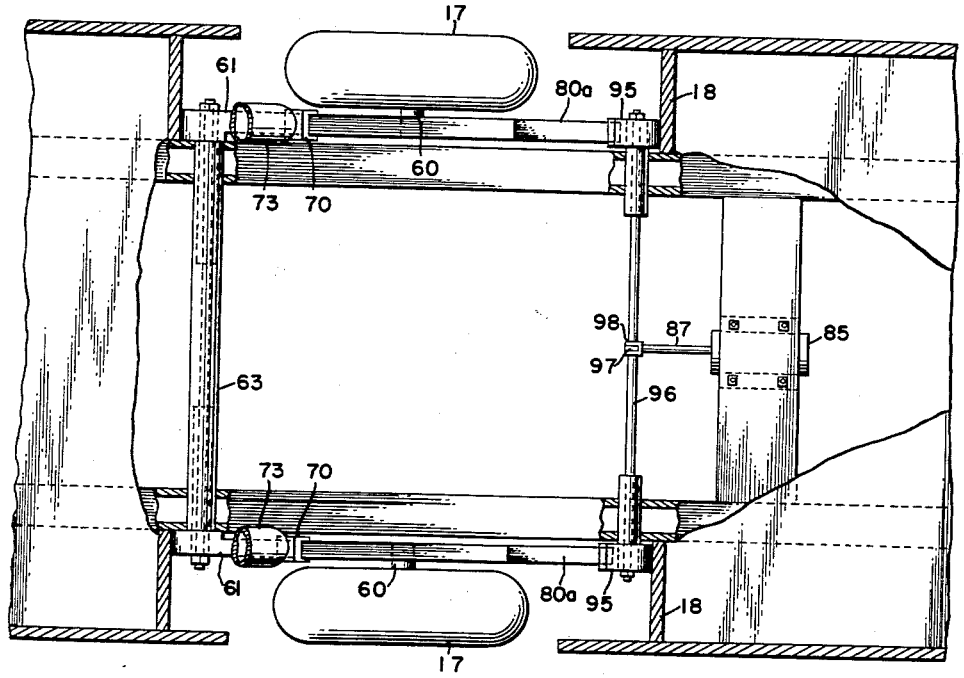
Figures 8 and 9 are similar, respectively, to Figures 6 and 7 but show a second embodiment for locking the rear of the truck body in road-traveling position.
Figure 8:
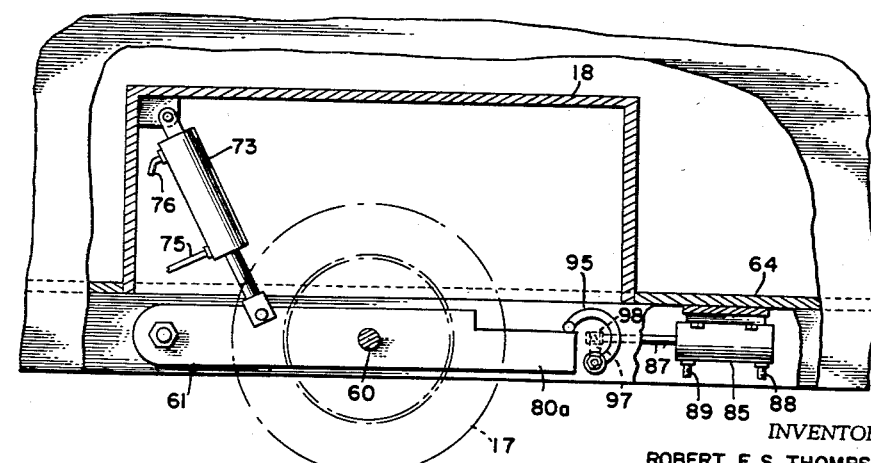

Figures 8 and 9 are generally similar to Figures 6 and 7 except that a second embodiment of the rear wheel locking mechanism is shown and like numerals indicate similar members. In Figures 8 and 9, however, the rear ends of arm extension 80a are engaged and locked by C springs 95. These springs are secured to pivotable rod 96 extending across the truck beneath the body floor 64, and near the center of rod 96 is upwardly-extending arm 97 which is rigidly secured to rod 96. Piston rod 87 is pivotally attached at 98 to arm 97. Thus, by pumping fluid to cylinder 85 through line 88, C springs 95 are rotated to a position to engage arm extensions 80a and lock wheels 17 in road-traveling position. Upon pumping fluid to cylinder 85 through line 89, C springs 95 are moved out of engagement with arm extensions 80a and the truck body is then free to be lowered towards the ground.

Figure 10:
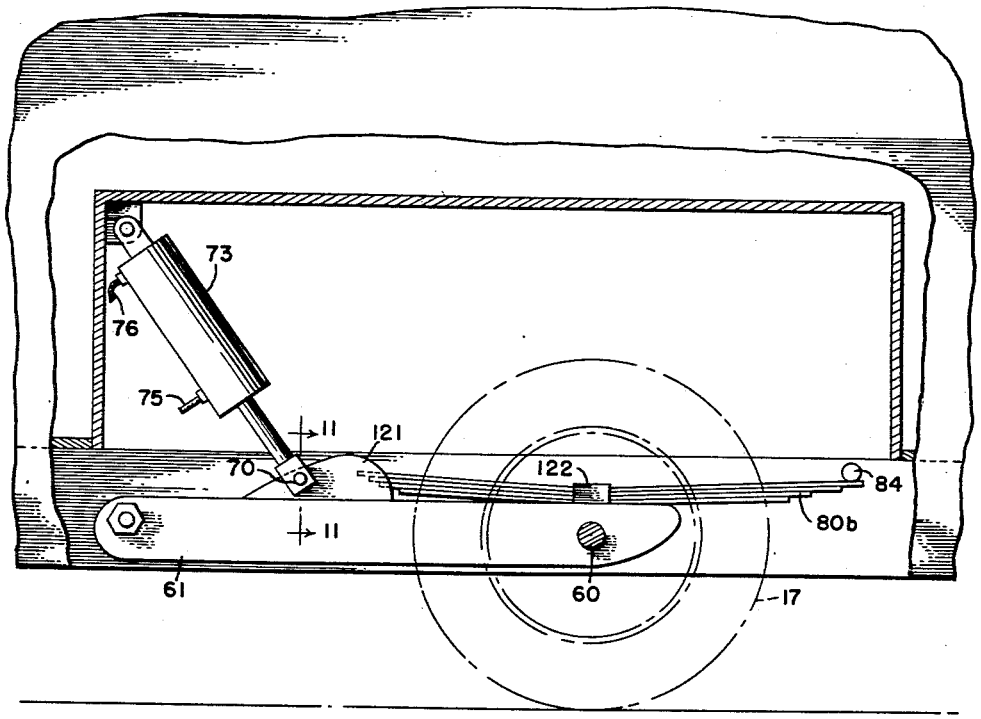
Figure 10 is a view similar to Figure 6 but illustrating another manner of springing the rear wheels when the truck bed is in road-traveling position.
Figure 11:
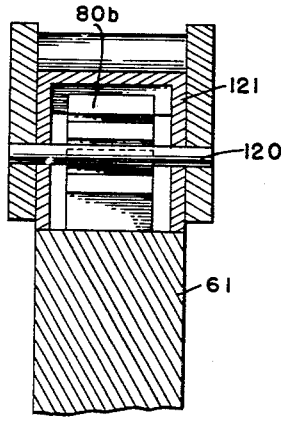
Figure 11 is a vertical sectional view, taken in the direction of the arrows along the line 11—11 in Figure 10, of a constructional detail of the mechanism.

In Figure 10 an alternative means for springing the rear wheels is shown. Thus the piston rod of cylinder 73 is pivoted at 70 on arm 61. As shown in Figure 11, the piston rod pivots around pin 120 which extends between the sides of the inverted U-shaped member 121 riding on the upper side of arm 61 between its point of pivotal attachment with the truck body and stub axle 60. The middle portion of spring 80b is connected to arm 61 above stub axle 60 by bracket 122. When the truck bed is in road-traveling position the rear end of spring 80b rides under pin 84 while its forward end is held freely against the upper strap of U-shaped member 121.

Referring now to Figures 12 and 13, a modified form of the mechanism for latching the rear road wheels 17 in their road-traveling positions is illustrated that essentially comprises a laterally extending shaft 196 that is rotatably mounted in the opposite sides of the bed 13; which laterally extending shaft 196 is suitably operated by an associated hydraulic motor, not shown (in a manner similar to the shaft 96 of the latch mechanism shown in Figure 9). Specifically, the outer extremities of the shaft 196 are rotatably supported in associated tubular bearing members 196a respectively carried by the opposite sides of the bed 13 rearwardly of the laterally aligned trunnions 60 carrying the rear wheels 17. As previously explained, the trunnions 60 are respectively carried by the pivotally mounted arms 61 that respectively carry the leaf spring sets 80 projecting rearwardly therefrom into cooperating relation with respective latch members 195 respectively rigidly secured on the extreme outer ends of the shaft 196.

In Figure 12, the latch member 195 is shown in solid lines in its released or unlatched position disengaging the extreme outer end of the associated leaf spring set 80, and is shown in dotted lines in its engaged or latched position engaging the extreme outer end of the associated leaf spring set 80. Of course, it will be understood that the latch members 195 are simultaneously operated between their latched and unlatched positions in response to corresponding rotations of the shaft 196 by the associated hydraulic motor, not shown. When the latch members 195 occupy their latched positions engaging the extreme outer ends of the respective leaf spring sets 80, the body 13 is resiliently supported through the leaf spring sets 80 upon the rear road wheels 17 in their road-traveling positions. On the other hand, when the latch members 195 occupy their unlatched positions disengaging the extreme outer ends of the respective leaf spring sets 80, the body 13 is supported through the associated hydraulic motors, not shown, upon the rear road wheels 17, so that the rear road wheels 17 may be readily elevated and lowered, as desired, with respect to the bed 13 by the associated hydraulic motors mentioned.

The elevating and lowering and locking means associated with the rear of the truck bed have been described with reference to a unitary truck, but they are also useful in association with a trailer bed, for instance having means at or near the goose neck for raising and lowering the front portion of the bed between dock and ground levels. Also, even though the drawings show locking means for securing the truck bed in road-traveling position, such structure can be omitted and the bed held in position by maintaining pressure on the top of pistons 24 and 72 but this has obvious disadvantages.

An advantageous feature of the present invention lies in that in the preferred embodiment of the apparatus each of the three hydraulic cylinders employed to raise and lower the truck bed can be independently actuated, although if desired these cylinders can be operated interdependently in various ways. Figure 14 represents a preferred fluid flow diagram which provides separate control of the elevating and lowering cylinders. Thus the front of the bed can be lowered without lowering the rear and vice versa, and in addition a given side of the rear part of the bed can be lowered without lowering the other side. From this, it can be seen that the bed is highly maneuverable and can assume a variety of positions making it readily adaptable to a number of loading and unloading problems.

The system of Figure 14 includes the supply tank 100 for the hydraulic fluid which tank is connected by line 101 to hydraulic pump 102. The pressure side of the pump is in turn connected with a commercially available four spool control valve 103 which has blocked cylinder parts when the handles 103a–d are in neutral position, and since in the usual system, the pump runs continuously when connected to power, return line 104 to tank 100 is provided to return fluid when all of the handles 103a–d are in neutral position. In this drawing, line 105 extends from valve 103 to lines 46 and 89, which either pass fluid to or from the lower ends of the respective locking cylinders 37a and 85 depending on whether the locking devices thereof are being extended or retracted. Similarly, lines 47 and 88 carry fluid by way of line 106 to or from the upper ends of the respective locking cylinders 37a and 85 in correspondence with such extension or retraction. Thus, by moving handle 103a in one position from neutral, fluid is charged through lines 105, 46 and 89 and fluid is withdrawn by way of lines 47, 88 and 106, so as to retract both the rear locking pins 84 and the front locking arms 35 and 36. In the second position from neutral of valve handle 103a the fluid flows are reversed to extend the respective locking devices. Although cylinders 37a and 85 are shown as co-acting to lock simultaneously the front and rear truck bed elevating mechanisms in road-traveling position, they could, of course, be separately actuated as, for example, by providing a fifth spool in valve 103.

Valve handle 103b can be moved to a first position from neutral in which fluid is passed by line 26a to above the piston in cylinder 23 while being withdrawn from below the piston through line 27 to elevate the forward end of the body, and in the second active position of handle 103b reverse fluid flow is effected to lower the forward end of the body. In a similar manner, valve handles 103c and d are separately operated to introduce and withdraw fluid from valve 103 to cylinders 73 by way of lines 75 and 76 to selectively raise or lower the respective sides of the body. Released fluid from the various cylinders is returned from valve 103 to tank 100 through line 104. In order that the rear end of the truck can ride upon springs 80 or 89b when they are locked by pins 84 or C springs 95, release valve 110 is provided so that the pressure on the fluid in lines 75 and 76 is released. As shown valve 110 also releases pressure in line 26a but as the truck has front wheel springs such release is not as advantageous as the release at the rear wheels. Valve 110 is supplied with handle 111 which can be lowered to release simultaneously the fluid pressure in lines 76 and 26a. Thus upon actuation of handle 111 fluid passes from lines 112, 113 and 114 through valve 110 and line 115 to line 104 and tank 100.

It can be readily appreciated from the above, that there has been provided a highly desirable road-traveling vehicle whose bed is adapted to be elevated and lowered. In operation the front of the truck body can be elevated by passing fluid through line 26a to cylinder 23, and when this portion of the bed descends fluid enters the cylinder by way of line 27. The truck bed at each rear road wheel can be raised by pumping fluid through line 76 to cylinder 73 and the bed can be lowered to the ground by supplying the pressured fluid to the cylinder by way of line 75. Thus these portions of the truck bed can be elevated and lowered together or separately to a position substantially above and below the road-traveling position. Preferably, the parts of the device are proportioned to allow raising of the bed to conventional loading dock levels, or as high as desired, and to allow lowering of the bed directly upon the ground.

The fluid circuit system may be carried entirely by the bed 13, and the control valve 103 and the release valve 110 may be housed in a space defined in the extreme right rear portion of the van 15, as illustrated in Figure 15. More particularly, as illustrated, the rear wall 201 of the van 15 is provided with the rear doorway therein in which the rear door 16a is suitably hinged, as previously mentioned; and also the extreme rear end of the bed carries a rear bumper 202 disposed rearwardly of the rear wall 201. An opening 203 is provided in the lower right-hand portion of the rear wall 201 to the right of the rear door 16a and above the rear bumper 202; which opening 203 is provided with a cooperating door 204. The door 204 is hinged along the top edge thereof, as indicated at 205, and is selectively moved into open and closed positions with respect to the opening 203, the door 204 being illustrated in its open position in Figure 15. As previously noted, the valves 103 and 110 are housed in the rear space in the van 15 that is disposed immediately behind the opening 203 so that the operating handles thereof are readily accessible from the exterior when the door 204 occupies its open position with respect to the opening 203.

In view of the foregoing, it will be understood that in order selectively to control the fluid circuit system, the door 204 is operated into its open position so as to render accessible the operating handles of the valves 103 and 110 through the opening 203. In the arrangement, each of the handles 103a, 103b, 103c and 103d of the valve 103 is operated from its normal "hold" position illustrated inwardly into its "contraction control" position and is operated from its normal "hold" position illustrated outwardly into its "expansion control" position, while the handle 111 of the valve 110 is operated from its normal "closed" position illustrated, inwardly into its "release control" position. Also, the handle 111 of the valve 110 is normally biased into its normal "closed" position illustrated; whereby it is moved into this position automatically in response to movement of the door 204 into its open position with respect to the opening 203.

Further, the door 204 carries a first actuating block 206 that cooperates with the handles of the valve 103 and a second actuating block 207 that cooperates with the handle of the valve 110. More particularly, when the door 204 is moved into its closed position, the block 206 engages any one of the handles 103a, 103b, 103c or 103d of the valve 103 that might happen to occupy its "expansion control" position and operates the same back into its "hold" position; and the block 207 engages the handle 111 of the valve 110 and moves it from its "closed" position inwardly into its "release" position. Hence, it will be understood that the mere operation of the door 204 into its closed position brings about the return of all of the handles 103a, 103b, 103c and 103d from their "expansion control" position into their "hold" positions and operation of the handle 111 into its "release" position, thereby to accommodate bleeding of the fluid from the expansion ends of the hydraulic motors 23 and 73, so as to insure the return of the bed 13 back into its road-traveling position, in the manner described above.

In view of the foregoing, it is apparent that there has been provided a road vehicle including a load-carrying body and incorporating an improved arrangement for selectively elevating and lowering the body with respect to the roadway upon which the vehicle is supported and an improved arrangement for selectively latching and unlatching the body in its road-traveling position.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A unitary road truck comprising a front cab provided with front road wheels, a rear bed provided with rear road wheels, a pair of laterally spaced-parat and substantially vertically disposed guide members rigidly secured to the rear portion of said front cab, a pair of laterally spaced-apart and substantially vertically disposed guide elements rigidly secured to the front portion of said rear bed and disposed in respective sliding engagements with said guide members, a laterally extending cross member connecting together said guide members, a laterally extending cross element connecting together said guide elements, means including a hydraulic motor acting between said cross member and said cross element for imparting selective vertical movements therebetween, so that the front portion of said rear bed may be selectively elevated and lowered with respect to the rear portion of said front cab, a pair of latches pivotally mounted upon said cross element respectively adjacent to the opposite sides thereof and respectively cooperating with the upper ends of said guide members, said latches being movable outwardly into respective latched positions with respect to the upper ends of said guide members and being movable inwardly into respective unlatched positions with respect to the upper ends of said guide members, said latches in their latched positions restraining the front portion of said rear bed in its elevated position with respect to the rear portion of said front cab, hydraulic actuated means including a cylinder pivotally connected to one of said latches and a cooperating piston pivotally connected to the other of said latches for selectively moving said latches between their latched and unlatched positions, and a pair of stops respectively cooperating with said latches for respectively limiting inward movements thereof so as to insure movements of both of said latches completely into their unlatched positions when said hydraulic actuated means moves said latches inwardly toward their unlatched positions.

2. A unitary road truck comprising a front cab provided with a pair of front road wheels, a longitudinally extending rear bed provided with a pair of rear road wheels, a substantially vertically disposed guide member rigidly secured to the rear portion of said front cab, a substantially vertically disposed guide element rigidly secured to the front portion of said rear bed and disposed in sliding engagement with said guide member, means for imparting selective vertical movements between said guide member and said guide element, so that the front portion of said rear bed may be selectively elevated and lowered with respect to the rear portion of said front cab, a pair of laterally spaced-apart and longitudinally extending arms respectively disposed on opposite sides of the rear portion of said rear bed and pivotally mounted at the front ends thereof upon said rear bed for vertical movements with respect thereto, a pair of stub shafts respectively carried by the rear ends of said arms and respectively extending laterally outwardly in opposite directions therefrom and respectively carrying said rear road wheels, said arms having road-traveling positions with respect to the rear portion of said rear bed as well as other positions respectively disposed above and below said road-traveling positions, so that said rear road wheels have corresponding positions with respect to the rear portion of said rear bed, a pair of laterally spaced-apart and longitudinally extending fenders respectively disposed on opposite sides of the rear portion of said rear bed and carried thereby and respectively positioned above said arms and respectively receiving said rear road wheels, a pair of hydraulic motors of the expansion-contraction type respectively arranged in said fenders and respectively connecting said fenders to said arms, means for selectively expanding and contracting said hydraulic motors, so as to impart selective vertical pivotal movements to said arms with respect to the rear portion of said rear bed, so that said rear road wheels may be selectively elevated and lowered with respect to the rear portion of said rear bed, a pair of resilient cushioning mechanisms selectively connectible and disconnectible between the rear portion of said rear bed and the respective rear ends of said arms when said arms occupy their road-traveling positions, said hydraulic motors acting directly between said fenders and said arms and entirely independently of said resilient cushioning mechanisms, and hydraulic actuated means for selectively connecting and disconnecting simultaneously said resilient cushioning mechanisms between the rear portion of said rear bed and the respective rear ends of said arms.

3. A road vehicle comprising a longitudinally extending frame, a pair of front road wheels carried by the front of said frame, a pair of laterally spaced-apart and longitudinally extending arms respectively disposed on opposite sides of the rear of said frame and pivotally mounted at the front ends thereof upon said frame for vertical movements with respect thereto, a pair of stub shafts respectively carried by the rear ends of said arms and respectively extending laterally outwardly in opposite directions therefrom, a pair of rear road wheels respectively carried by said stub shafts, said arms having road-traveling positions with respect to the rear of said frame as well as other positions respectively disposed above and below said road-traveling positions, so that said rear road wheels have corresponding positions with respect to the rear of said frame, a pair of laterally spaced-apart and longitudinally extending fenders respectively disposed on opposite sides of the rear of said frame and carried thereby and respectively positioned above said arms and respectively receiving said rear road wheels, a pair of hydraulic motors of the expansion-contraction type respectively arranged in said fenders and respectively connecting said fenders to said arms, means for selectively expanding and contracting said hydraulic motors, so as to impart selective pivotal movements to said arms with respect to the rear of said frame in order selectively to elevate and to lower said rear road wheels with respect to the rear of said frame, a pair of resilient cushioning mechanisms selectively connectible and disconnectible between the rear of said frame and the rear ends of said arms when said arms occupy their road-traveling positions, said hydraulic motors acting directly between said fenders and said arms and entirely independently of said resilient cushioning mechanisms, and hydraulic actuated means for selectively connecting and disconnecting simultaneously said resilient cushioning mechanisms between the rear of said frame and the respective rear ends of said arms.

4. The road vehicle set forth in claim 3, wherein said resilient cushioning mechanisms are respectively carried by the rear ends of said arms and are respectively connectible and disconnectible with respect to the opposite sides of the rear of said frame.

5. The road vehicle set forth in claim 3, wherein said resilient cushioning mechanisms are respectively carried by the opposite sides of the rear of said frame and are respectively connectible and disconnectible with respect to the respective rear ends of said arms.

6. A road vehicle comprising a longitudinally extending frame, a pair of front road wheels carried by the front of said frame, a pair of laterally spaced-apart and longitudinally extending arms respectively disposed on opposite sides of the rear of said frame and pivotally mounted at the front ends thereof upon said frame for vertical movements with respect thereto, a pair of stub shafts respectively carried by the rear ends of said arms and respectively extending laterally outwardly in opposite directions therefrom, a pair of rear road wheels respectively carried by said stub shafts, said arms having road-traveling positions with respect to the rear of said frame as well as other positions respectively disposed above and below said road-traveling positions, so that said rear road wheels have corresponding positions with respect to the rear of said frame, a pair of laterally spaced-apart and longitudinally extending fenders respectively disposed on opposite sides of the rear of said frame and carried thereby and respectively positioned above said arms and respectively receiving said rear road wheels, a pair of hydraulic motors of the expansion-contraction type respectively arranged in said fenders and respectively connecting said fenders to said arms, means for selectively expanding and contracting said hydraulic motors, so as to impart selective pivotal movements to said arms with respect to the rear of said frame in order selectively to elevate and to lower said rear road wheels with respect to the rear of said frame, a pair of springs respectively connected to the rear ends of said arms and respectively extending rearwardly therefrom, a pair of latches respectively carried by the opposite sides of the rear of said frame and respectively cooperating with the rear ends of said springs, said latches being selectively operative into latched and unlatched positions with respect to the respective rear ends of said springs when said arms occupy their road-traveling positions, said hydraulic motors acting directly between said fenders and said arms and entirely independently of said springs, and hydraulic actuated means for selectively operating said latches simultaneously between their latched and unlatched positions.

7. A road vehicle comprising a longitudinally extending frame, a pair of front road wheels carried by the front of said frame, a pair of laterally spaced-apart and longitudinally extending arms respectively disposed on opposite sides of the rear of said frame and pivotally mounted at the front ends thereof upon said frame for vertical movements with respect thereto, a pair of stub shafts respectively carried by the rear ends of said arms and respectively extending laterally outwardly in opposite directions therefrom, a pair of rear road wheels respectively carried by said stub shafts, said arms having road-traveling positions with respect to the rear of said frame as well as other positions respectively disposed above and below said road-traveling positions, so that said rear road wheels have corresponding positions with respect to the rear of said frame, hydraulic motor means acting between said frame and said arms for imparting selective pivotal movements to said arms with respect to the rear of said frame, so that said rear road wheels may be selectively elevated and lowered with respect to the rear of said frame, a pair of springs respectively carried by the rear ends of said arms, each of said springs extending both forwardly of and rearwardly of the rear end of the associated arm, a pair of members respectively carried by said arms and respectively engaging the front ends of said springs, a pair of latches respectively carried by the opposite sides of the rear of said frame and respectively cooperating with the rear ends of said springs, said latches being selectively operative into latched and unlatched positions with respect to the respective rear ends of said springs when said arms occupy their road-traveling positions, and hydraulic actuated means for selectively operating said latches simultaneously between their latched and unlatched positions.

8. A unitary road truck comprising a front cab provided with front road wheels, a rear bed provided with rear road wheels, a pair of laterally spaced-apart and longitudinally extending hollow supporting beams rigidly secured to said front cab and terminating adjacent to the rear portion thereof, a laterally extending cross member provided at the opposite ends thereof with a pair of rigid and forwardly directed projections respectively extending into the rear ends of said hollow supporting beams and respectively rigidly secured thereto, a pair of laterally spaced-apart and substantially vertically disposed guide members respectively rigidly secured to the opposite ends of said cross member, a pair of laterally spaced-apart and substantially vertically disposed guide elements rigidly secured to the front portion of said rear bed and disposed in respective sliding engagements with said guide members, a laterally extending cross element connecting together said guide elements, means including a hydraulic motor acting between said cross member and said cross element for imparting selective vertical movements to said cross element with respect to said cross member, so that the front portion of said rear bed may be selectively elevated and lowered with respect to the rear portion of said front cab, a pair of latch arms respectively carried by said guide elements and selectively operative into latched and unlatched positions with respect to said guide members, said latch arms in their latched positions respectively engaging the upper ends of said guide members and restraining the front portion of said rear bed in its elevated position with respect to the rear portion of said front cab, and hydraulic actuated means for selectively operating simultaneously said latch arms between their latched and unlatched positions.

9. A unitary road truck comprising a front cab provided with front road wheels, a rear bed provided with rear road wheels, first guide structure including a pair of laterally spaced-apart and substantially vertically disposed guide members rigidly secured to the rear portion of said front cab, second guide structure including a pair of laterally spaced-apart and substantially vertically disposed guide elements rigidly secured to the front portion of said rear bed, said guide members being disposed in respective sliding engagements with said guide elements, means including a hydraulic motor acting between said guide structures for imparting selective vertical movements therebetween, so that the front portion of said rear bed may be selectively elevated and lowered with respect to the rear portion of said front cab, a pair of laterally spaced-apart latch arms respectively carried by said guide elements and selectively operative into latched and unlatched positions with respect to said guide members, said latch arms in their latched positions respectively engaging the upper ends of said guide members and restraining the front portion of said rear bed in its elevated position with respect to the rear portion of said front cab, hydraulic actuated means for selectively operating simultaneously said latch arms between their latched and unlatched positions, and means for selectively elevating and lowering the rear portion of said rear bed with respect to said rear road wheels.

10. A unitary road truck comprising a front cab provided with front road wheels, a rear bed provided with rear road wheels, a pair of laterally spaced-apart and substantially vertically disposed guide members rigidly secured to the rear portion of said front cab, a pair of laterally spaced-apart and substantially vertically disposed guide elements rigidly secured to the front portion of said rear bed and disposed in respective sliding engagements with said guide members, means including a hydraulic motor acting between said guide members and said guide elements for imparting selective vertical movements therebetween, so that the front portion of said rear bed may be selectively elevated and lowered with respect to the rear portion of said front cab, a pair of latch arms respectively carried by said guide elements and selectively operative into latched and unlatched positions with respect to said guide members, said latch arms in their latched positions respectively engaging the upper ends of said guide members and restraining the front portion of said rear bed in its elevated position with respect to the rear portion of said front cab, and hydraulic actuated means for selectively operating simultaneously said latch arms between their latched and unlatched positions.

References Cited in the file of this patent
UNITED STATES PATENTS

| | | |
|---|---|---|
| 1,447,393 | McMillen | Mar. 6, 1923 |
| 2,495,449 | Francis | Jan. 24, 1950 |
| 2,540,100 | Coeur | Feb. 6, 1951 |
| 2,560,715 | Bill | July 17, 1951 |
| 2,581,556 | Rogers | Jan. 8, 1952 |
| 2,610,865 | Cantrell | Sept. 16, 1952 |
| 2,657,939 | Beebe | Nov. 3, 1953 |
| 2,774,604 | Rendel | Dec. 18, 1956 |